Oct. 12, 1943.  M. E. LANGE  2,331,704
MACHINE TOOL
Filed Oct. 31, 1939    5 Sheets-Sheet 5
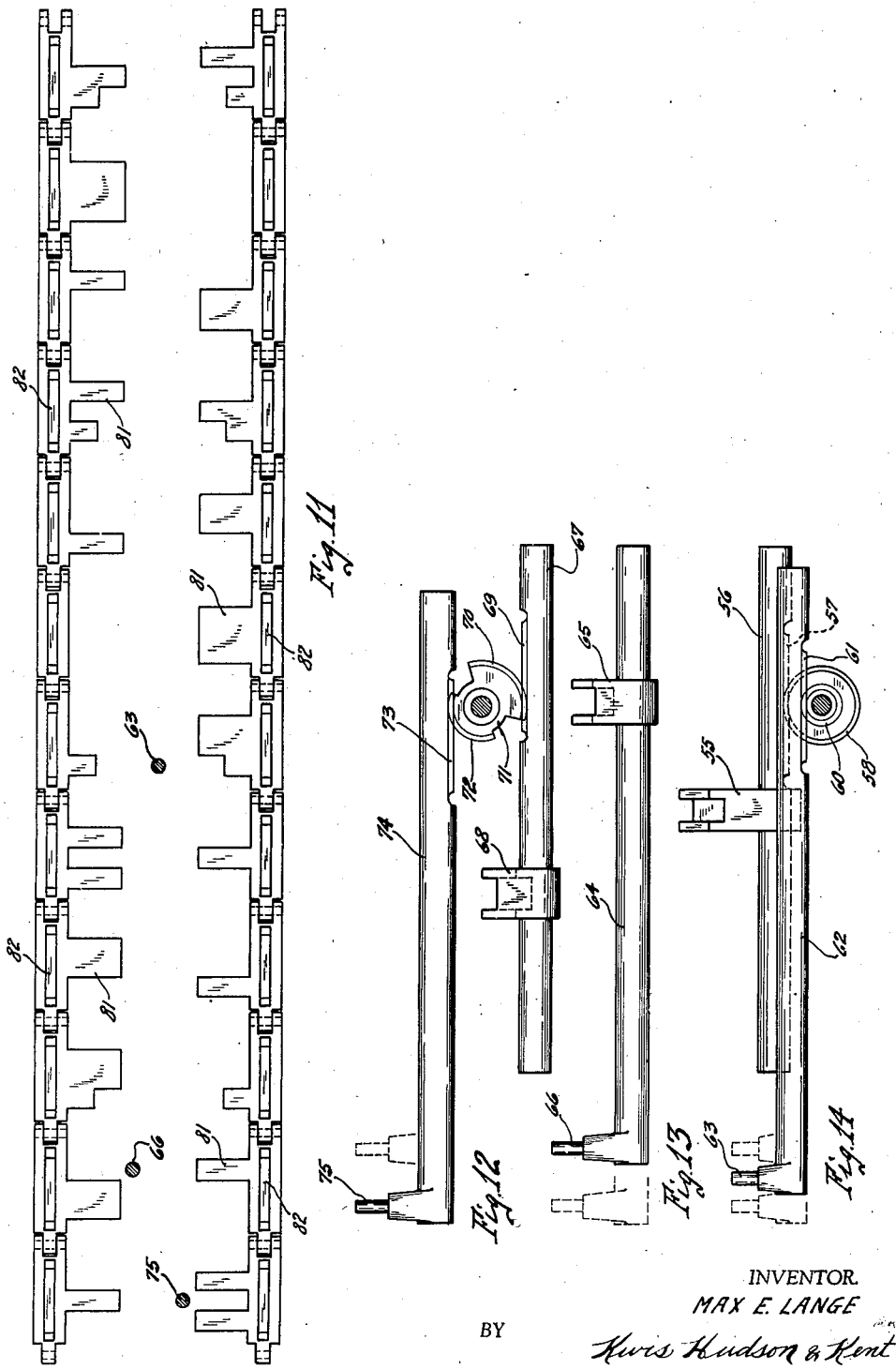
INVENTOR.
MAX E. LANGE
BY
Kwis Hudson & Kent
ATTORNEYS Patented Oct. 12, 1943

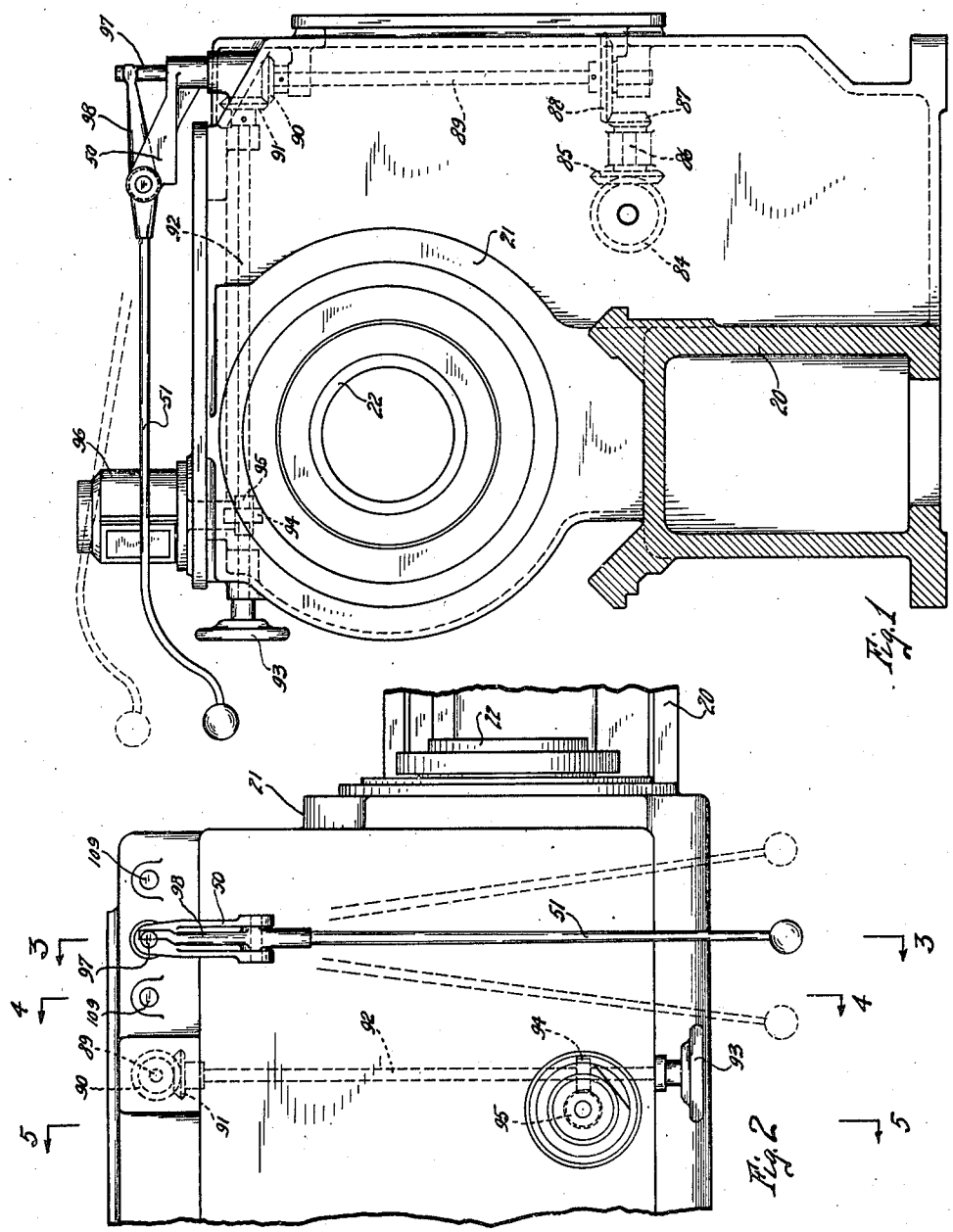

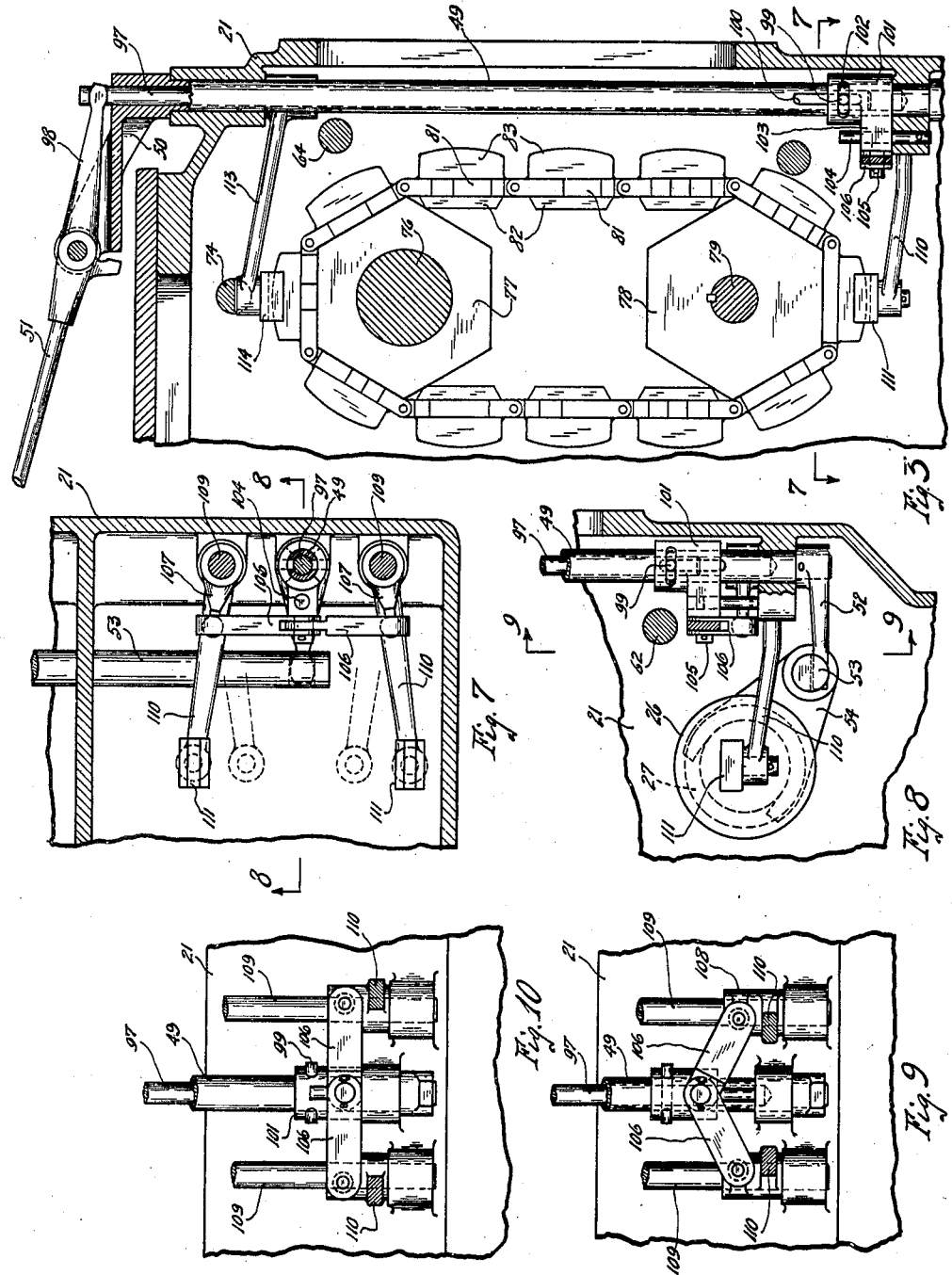

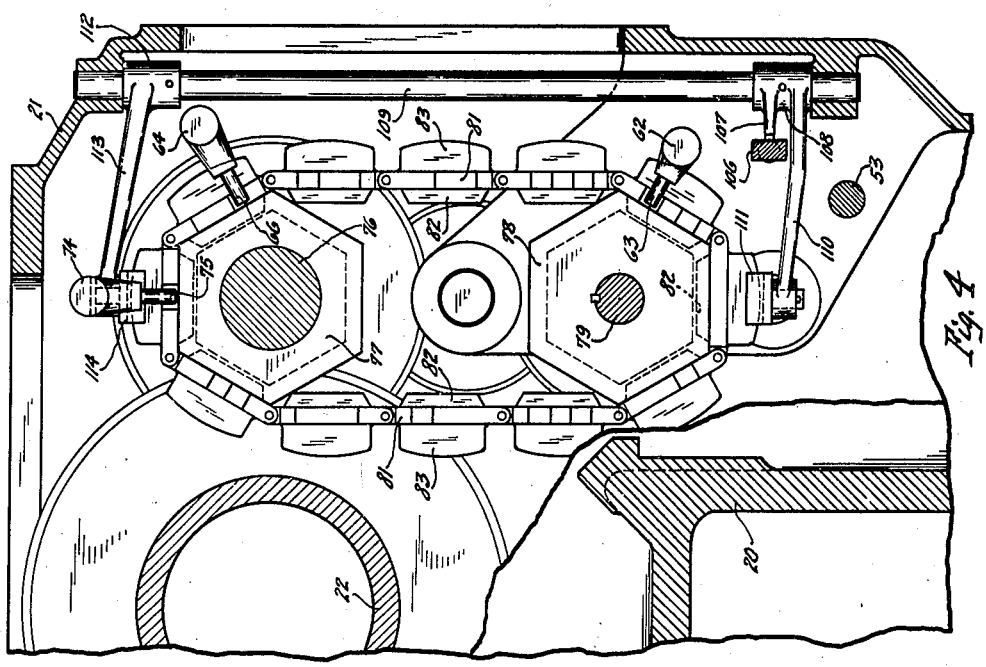
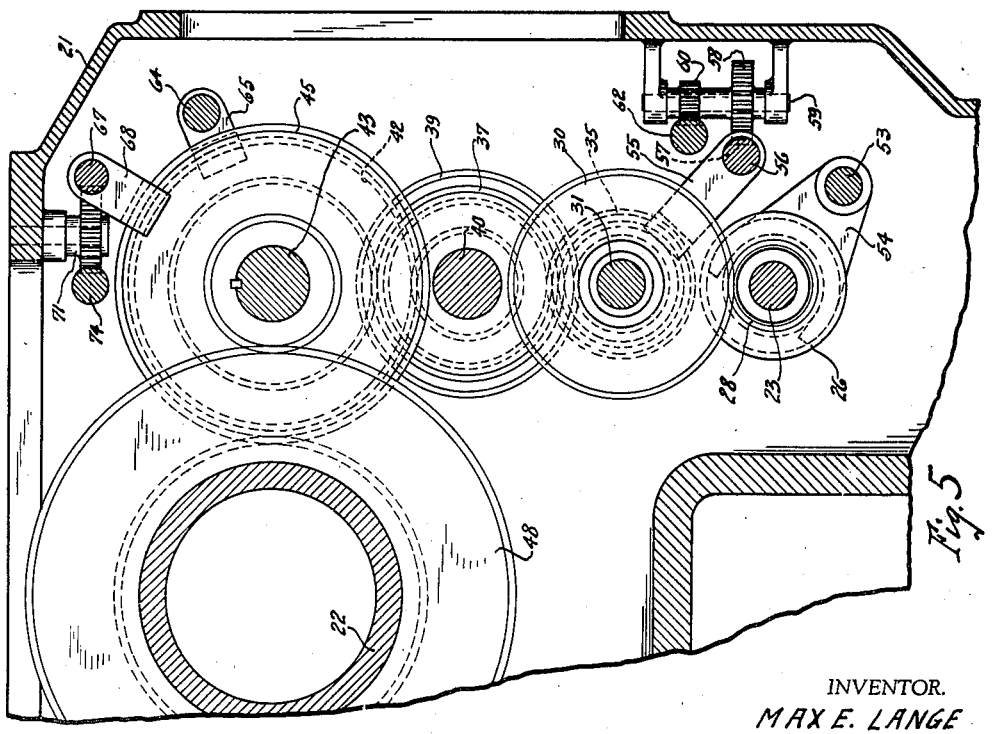

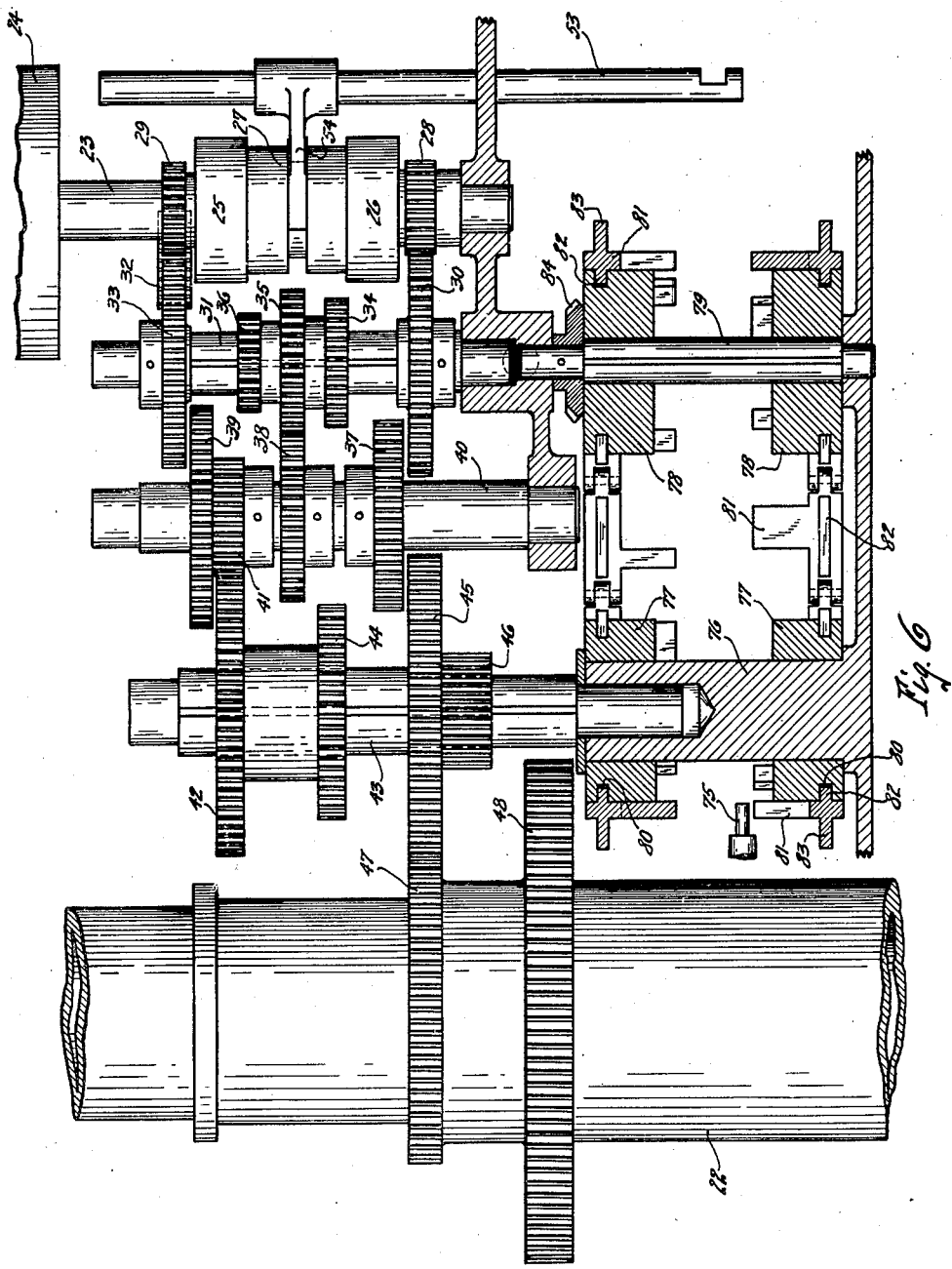

2,331,704

UNITED STATES PATENT OFFICE 2,331,704

MACHINE TOOL

Max E. Lange, Cleveland Heights, Ohio, assignor to The Warner & Swasey Company, Cleveland, Ohio, a corporation of Ohio Application October 31, 1939, Serial No. 302,193

24 Claims. (Cl. 74—473)

This invention relates to a machine tool and more particularly to a mechanism for selecting or presetting the rates of movement of a movable part of the machine tool, such as the rotatable work spindle or a movable slide.

An object of the invention is to provide a mechanism for selecting or preselecting the rates of movement of a movable part of a machine tool and which is of such character that it may be effectively employed in operative association with a change speed drive for said part wherein the shiftable elements of the drive and the members that effect the shifting of said elements are arranged relatively far apart with respect to each other.

In the larger sizes of machine tools the shiftable elements of the change speed means in the head for driving the spindle at different speeds are usually located at relatively large distances from each other, with the result that the members which shift said shiftable elements are likewise spaced relatively far apart.

Therefore another object of the present invention is to provide a mechanism for selecting or preselecting the different speeds of a movable part of a machine tool, and which mechanism is particularly adapted and effective in conjunctive use with the change speed means in the headstocks of the larger sizes of machine tools.

A further object is to provide a mechanism for selecting or preselecting the different rates of movement of a movable part of a machine tool and for actuating the shiftable elements of the change speed means for imparting said different rates of movement to said part, and which mechanism is particularly adapted for efficient use and operation in those instances wherein the shiftable elements of the change speed means are relatively large and heavy and necessitate substantial and sturdy actuating devices for moving the same.

A still further object is to provide in combination with a machine tool having a movable part to which different rates of movement are imparted by change speed means including shiftable elements that are spaced relatively far apart, a mechanism for selecting or preselecting the different rates of movement of said part and for effecting a movement of said shiftable elements to obtain said rates and which is so constructed that it can be operatively associated with said shiftable elements in a direct manner and without requiring the use of a large or complicated number of intermediate motion transmitting elements between said selecting or preselecting mechanism and the shiftable elements.

A still further object is to provide in combination with a machine tool having a movable part to which different rates of movement are imparted by a change speed means including shiftable elements, a mechanism for selecting or preselecting the different rates of movement of said part and including indexible and movable members so arranged and constructed as to be located in the closest practical proximity to the shiftable elements of the change speed means, wherefore the necessity is obviated of providing extended motion transmitting means between the shiftable elements and the indexible and movable members of said mechanism.

Further and additional objects and advantages not hereinbefore referred to will become apparent during the detailed description which is to follow of an embodiment of the invention that is illustrated in the accompanying drawings wherein, Fig. 1 is a view partly in elevation and partly in section through a machine tool and is taken looking at the end of the headstock and facing the work spindle mounted therein.

Fig. 2 is a fragmentary top plan view of the headstock shown in Fig. 1.

Fig. 3 is a fragmentary vertical sectional view through the headstock taken substantially on line 3—3 of Fig. 2, looking in the direction of the arrows.

Fig. 4 is a similar view taken substantially on line 4—4 of Fig. 2, looking in the direction of the arrows.

Fig. 5 is a fragmentary vertical sectional view through the headstock and is taken substantially on line 5—5 of Fig. 2, looking in the direction of the arrows.

Fig. 6 is a developed view of the change speed gearing in the headstock and shows partly in section the selecting or preselecting mechanism.

Fig. 7 is a fragmentary horizontal sectional view taken substantially on line 7—7 of Fig. 3, looking in the direction of the arrows.

Fig. 8 is a fragmentary vertical sectional view taken substantially on line 8—8 of Fig. 7, looking in the direction of the arrows, and shows certain of the parts in a different position than are the corresponding parts shown in Fig. 3.

Fig. 9 is a fragmentary vertical sectional view taken substantially on line 9—9 of Fig. 8, looking in the direction of the arrows.

Fig. 10 is a view similar to Fig. 9, except that the parts are illustrated in a different operative position and correspond to the position of the same parts as shown in Fig. 3.

Fig. 11 is a developed view of the selecting or preselecting chains forming part of the selecting or preselecting mechanism and Figs. 12, 13 and 14 are detached detail views of the motion transmitting members for shifting the shiftable elements of the change speed gearing, the two operative positions of the motion transmitting members shown in Figs. 12 and 13 being indicated, respectively, by full lines and by dash lines, while the three operative positions of the motion transmitting members shown in Fig. 14 are indicated by dash lines and by full lines.

The invention, by way of example, is illustrated and described herein as used in conjunction with the change speed gearing in the headstock of a machine tool for selecting or preselecting the speeds of the work spindle, but it will be understood that the invention can be employed in other relationships to select or preselect the rates of movement of other movable parts of a machine tool, such as a slide for example.

Referring to Fig. 1, the bed of the machine tool is indicated at 20 and the headstock at 21. The headstock mounts the rotatable work spindle 22. The work spindle can be driven at any one of a number of different speeds by the means now to be described and which is housed and mounted in the headstock.

Referring particularly to Fig. 5 and the developed view of Fig. 6, it will be seen that there is provided a main drive shaft 23 which carries, in this instance, a pulley 24 that can be operatively connected to a power source. The main drive shaft 23 is provided with clutch elements 25 and 26, freely rotatable on the shaft, while intermediate said clutch elements is a shiftable clutch element 27 that is splined to the shaft to rotate therewith and be moved endwise thereof into clutching engagement with either the element 25 or 26. The clutch element 26 is integral with a gear 28, while the clutch element 25 is integral with a gear 29.

The gear 28 meshes with a gear 30 fixed to a shaft 31 that is rotatably supported in the headstock, while the gear 29 meshes with an idler gear 32 which, in turn, meshes with a gear 33 likewise fixed to the shaft 31. It will thus be seen that when the shiftable clutch member 27 is clutched to the clutch element 25 or the clutch element 26 rotative movement will be imparted to the shaft 31 but in opposite directions depending upon which element the member 27 is clutched to.

A three-step gear cone formed of the gears 34, 35 and 36 is splined on the shaft 31 intermediate the gears 30 and 33 and endwise movement of said three-step gear cone will be effective to bring the gear 34 into mesh with a gear 37 or the gear 35 into mesh with a gear 38 or the gear 36 into mesh with a gear 39, all of which gears 37, 38 and 39 are fixed to a shaft 40 rotatably mounted in the headstock.

It will be apparent that rotative movement can be imparted to the shaft 40 at any one of three different speeds and in opposite directions.

Formed integral with the gear 39 is a gear 41 that can be meshed with a gear 42 of a two-step gear cone splined on a shaft 43. This two-step gear cone on the shaft 43 also includes the gear 44 which can be intermeshed with the gear 37 on the shaft 40. It will thus be apparent that the shaft 43 can be driven in opposite directions at any one of six speeds. The shaft 43 has a second two-step gear cone splined thereon and formed of the gears 45 and 46, and which can be selectively intermeshed, respectively, with gears 47 and 48 fixed on the work spindle 22, wherefore it will be apparent that the work spindle can be driven in opposite directions at any one of twelve different speeds.

A vertically extending sleeve 49 is rockably supported in the headstock adjacent the rear thereof, and this sleeve at its upper end is provided with a bracket arm 50 extending over the top or cover plate of the headstock toward the front side thereof. A main control lever 51 is pivotally connected to the bracket arm 50 between the spaced ears thereof and this control lever extends over the headstock to a point beyond the front side thereof and within easy reach of the operator.

The sleeve 49, as clearly indicated in Fig. 8, has its lower end formed solid and provided below the bearing support for the sleeve with a reduced extension to which is fixed a lever arm 52. The free end of this lever arm 52 projects into a recess formed in a sliding rod 53 mounted in the headstock and having fixed thereto a yoke 54 that straddles the annular groove in the shiftable clutch member 27 (see Fig. 6).

It will be seen that when the sleeve 49 is rocked by a horizontal rocking movement of the control lever 51 from the full line position of the control lever, as shown in Fig. 2, to either of the dash line positions thereof, the lever arm 52 will also be rocked and the rod 53 moved endwise to shift the clutch element 27 from a neutral or disengaged position into clutched or engaged relationship with the clutch element 25 or the clutch element 26, as the case may be.

It will be understood that the full line position of the control lever 51 in Fig. 2 represents the neutral position, while the dash line positions thereof represent clutch engaged position, the right hand dash line position of the lever being that occupied for the forward drive of the work spindle, while the left hand dash line position is that occupied for reverse drive of the work spindle.

The shiftable elements or gear cones in the change speed gearing are shifted by the mechanism now to be explained. Reference to Fig. 5 will clearly indicate that the shafts which carry the gearing starting with the main drive shaft 23 are arranged one above the other in a vertical direction in the headstock. The three-step gear cone on the shaft 31 and formed of the gears 34, 35 and 36 is shifted by means of a yoke 55 which straddles the gear 35, and said yoke is carried or fixed to a shifting rod 56 slidably supported in suitable supports in the headstock and provided on one of its sides with a rack portion 57. The rack 57 meshes with a gear 58 formed on a sleeve that is freely rotatable on a pin 59 supported in suitably spaced bracket arms formed interiorly of the headstock, see Fig. 5.

The sleeve which carries the gear 58 is provided at a point spaced vertically above the gear with a smaller gear 60 which meshes with a rack portion 61 of a companion shifting rod 62. The gears 58 and 60 have a two-to-one relationship with each other, wherefore it will be seen that movement of the companion shifting rod 62 by mechanism, that cooperates with the operating device or pin 63 carried by the rod and later to be referred to, imparts movement to the shifting rod 56 of double the length of the movement of the companion rod 62. The three positions of the operating device or pin 63, as indicated in Fig. 14 in one instance by full lines and in the other two instances by dash lines, illustrate the three different operative positions to which the companion shifting rod 62 may be moved to move the shifting rod 55 so as to shift the three-step gear cone to any one of its three operative positions.

The rear two-step gear cone on the shaft 43 and formed of the gears 42 and 44 is shifted by means of a shifting rod 64 slidably supported in the headstock and having fixed thereto a yoke 65 which straddles the gear 42 (see Figs. 5 and 13). The shifting rod 64 is provided at one of its ends with an operating device or pin 66. Movement of the rod 64 to the two operative positions of said pin indicated by full and dash lines in Fig. 13 effects a shifting movement of said rear two-step gear cone to either one of its two operative positions.

The front two-step gear cone on the shaft 43 and formed of the gears 45 and 46 is shifted to either one of its two operative positions by means of a shifter rod 67 which has fixed thereto a yoke 68 that straddles the gear 45. The shifter rod 67 is provided with a rack 69 that intermeshes with a segmental gear portion 70 of a rockable member 71. This member 71 is also provided with a second segmental gear portion 72 and it will be noted that the radius of the segmental gear portion 70 is greater than the radius of the segmental gear portion 72 for a reason shortly to be explained. The gear portion 72 meshes with a rack portion 73 formed on a companion shifter rod 74 and which carries at its left hand end, as viewed in Fig. 12, an operating device or pin 75. When the pin 75 is shifted to either one of its two operative positions, as indicated by full lines and dash lines in Fig. 12, the shifter rod 74 moves endwise and rocks the member 71 and due to the difference in length of the radii of the gear portions 70 and 72 of said member a somewhat greater linear movement is imparted to the shifter rod 67 and the front two-step gear cone is thus shifted sufficiently far to move it into either one of its two operative positions.

It will be noted that the operating devices or pins 63, 66 and 75 of the shifter rods 62, 64 and 74, respectively, are located relatively close to the respective shiftable gear cones and, therefore, are necessarily arranged substantial distances apart.

The mechanism for selecting or preselecting the different spindle speeds and for actuating the pins and shifter rods to obtain the selected or preselected speeds will now be described, and it will appear during such description that said mechanism is especially adapted and efficient for use in a situation such as here involved, wherein the pins are located relatively large distances apart and must be actuated in many instances simultaneously by said mechanism.

The bearing support for one end of the shaft 43 is formed in an integral portion of the end wall of the headstock, and said portion extends inwardly of the headstock toward the intermediate wall thereof and is in the form of a cylindrical bearing shaft 76, as clearly indicated in Fig. 6.

Freely rotatable and endwise movable on the bearing shaft 76 is a pair of hexagonal sprockets 77. A pair of similar hexagonal sprockets 78 is splined on a shaft 79 that is rotatably supported in the end wall of the headstock and the intermediate wall thereof. Each sprocket is provided with a peripheral groove 80, see Figs. 4 and 6, the purpose of which will soon become apparent. The sprockets 77 and 78, adjacent the intermediate wall, support a chain, while the sprockets 77 and 78 adjacent the end wall likewise support a corresponding chain, and since the shafts 76 and 79 are parallel the chains supported by the sprockets will also be parallel. These chains are formed of a plurality of similar pivoted links 81 which are provided on their sprocket engaging sides with tongues 82 that ride in the peripheral grooves 80 of the sprockets as the particular link passes around said sprockets. Each link on its outer side opposite to the tongue 82 is provided with an outwardly extending lug 83 for a purpose which will later be made clear.

The links are identical to each other with respect to the tongues 82 and lugs 83. However, the links on their side edges which are adjacent to the links of the other parallel chain are each provided with a series of long and short projections, with the projections of the links of one of the chains cooperating with the projections on the corresponding links of the other chain. As illustrated in the developed view of Fig. 11, it will be seen that the projections formed on the adjacent edges of the links of the two chains constitute throughout the length of the chains cooperating pairs of long and short projections, short and long projections and projections of equal length, it being noted that the short projections are formed by the sides of the links themselves, while the long projections and the projections of equal length extend laterally from the sides of the links.

Reference to Figs. 4 and 11 will clearly indicate that the pins 63, 66 and 75 of the shifter rods are located between the adjacent sides of the parallel chains, and it will be seen by reference to Fig. 11 particularly that the pin 75 lies between the left hand pair of links 81, as viewed in the drawings, while the pin 66 is located between the second pair of links from the left hand end of the view and the pin 63 between the sixth pair of links from the left hand view.

It will be understood that when the sprockets and the chains are moved toward each other with an equalized movement the projections carried by the first, second and sixth pairs of links will be brought into engagement with said pins and will impart movement thereto to move the shifter rods and in turn shift the shiftable gear cones in the change speed gearing.

As already stated, the sprockets 78 are splined to the shaft 79, wherefore rotation of said shaft will rotate said sprockets and cause equal movement to be imparted to the parallel chains, it being appreciated that the chains themselves will impart corresponding rotative movement to the sprocket 77. In this manner the chains can be indexed so as to bring different pairs of links in operative relationship with the pins 63, 66 and 75.

It will be noted that there are twelve links in each chain corresponding to the twelve different spindle speeds in this instance, and that said chains can be indexed to selectively bring the twelve different pairs of cooperating links into operative relationship with the pins so that when the sprockets and chains are moved toward each other with an equalized movement the pins are shifted and, in turn, the gear cones to obtain the desired spindle speed.

It will be noted also that each link is provided with three projections in this instance, and it should be understood that end projections of each link will always be the projections engaging the pins 63 and 66, while the middle projection of each link always cooperates with the pin 75. The chains are indexed by the mechanism now to be explained.

A bevel gear 84 is fixed to the shaft 79 and this gear meshes with a bevel gear 85 fixed on a short shaft 86 that is rotatably supported in a bearing lug formed interiorly of the head. The shaft 86 has fixed to its end opposite to the gear 85 a bevel pinion 87 which meshes with a bevel gear 88 fixed to a vertically extending shaft 89 adjacent the lower end of the latter (see dotted line illustration Fig. 1). The vertically extending shaft 89 is rotatably supported in suitable bearing brackets formed on the interior of the headstock and has fixed to its upper end a bevel gear 90 which meshes with a bevel gear 91 fixed to the rear end of a horizontal shaft 92 that extends to the front of the headstock and is rotatably supported in suitable downwardly extending bearing brackets formed on the underside of the cover. The outer end of the shaft 92 at the front of the headstock has secured thereto a hand wheel 93, wherefore it will be seen that when the operator rotates said hand wheel rotative movement is imparted to the shaft 79 through the gearing and shafts just described, with a resultant rotative or indexing movement to the sprockets and the chains.

The shaft 92 adjacent the front of the headstock but interiorly thereof has fixed thereto a spiral gear 94 that meshes with a spiral gear 95 fixed to the lower end of the operating shaft of an indicating mechanism 96. It will thus be apparent that the operator when turning the hand wheel 93 can observe the indicator 96 and determine when the chains have been indexed to a position to enable the desired spindle speed to be obtained. It will be understood that the gearing connecting the hand wheel 93 to the sprockets and to the indicator is such that movement of the hand wheel through an arc sufficient to move the chains the length of one link, i. e., $\frac{1}{12}$, effects a corresponding movement of the dial in the indicating device 96.

It will also be understood that suitable spring points will be provided to hold the parts in the twelve different indexed positions to which they may be moved and that the dial of the indicating device 96 will at all times indicate the relative positions of the links on the sprockets in relation to spindle speeds as indicated on the dial.

The means whereby the sprockets and chains are moved toward and away from each other by an equalized movement and axially of the shafts 76 and 79 will now be explained. A rod 97 is slidably mounted in the sleeve 49 and extends above the upper end of said sleeve where it has a slot into which extends the rounded end of a rearward extension 98 of the main control lever 51. The rod 97 adjacent its lower end is provided with a transverse pin 99 that extends through diametrically opposed longitudinal or vertical slots 100 formed in the sleeve 49, wherefore it will be seen that the rod 97 can move vertically within the sleeve 49 when the main control lever 51 is rocked on its pivotal connection to the bracket 50 and is moved between the full line position of Fig. 1 and the dash line position thereof.

A collar 101 surrounds the lower end of the sleeve 49 and is freely movable thereon and this collar is provided with circumferentially extending segmental slots 102 through which the pin 99 extends, wherefore it will be seen that the sleeve 49 can rock within the collar 101 and relative thereto without imparting any motion to the collar. The collar 101 is provided with an integral projection 103, through which extends a vertical pin 104 fixedly carried by the lower bearing lug for the sleeve 49, see Figs. 3, 7 and 9. The projection 103 is free to slide on the pin 104, but said pin maintains said projection and the collar 101 against any rocking movement. As already stated, when the sleeve 49 is rocked by horizontal swinging movement of the main control lever, no movement is imparted to the collar 101 and projection 103, but it will be noted that when the rod 97 is moved vertically by a vertical movement of the main control lever, a corresponding vertical movement is imparted to the collar 101 and projection 103 through the operative connection formed by the pin 99 in the slots 102 of the collar, and in such case the projection 103 slides on the pin 104. The projection 103 at its end is provided with a bearing pin 105 which passes through openings formed in the adjacent ends of a pair of links 106. The opposite ends of these links 106 are pivotally connected to short lever arms 107 integrally formed on sleeves 108 that are fixed to vertically extending rods 109 rockably supported in suitable bearings formed in the headstock.

Each of the sleeves 108 below the short lever arms 107 is provided with an integral long lever arm 110 which swivelly carries at its outer or free end a shoe 111. The shoe 111 carried by one of the lever arms 110 cooperates with the lugs 83 of one of the chains, while the corresponding shoe of the other lever arm cooperates with the lugs 83 of the links of the other chain in a manner which will later be further explained. Each of the rods 109 adjacent its upper end has fixed thereto a sleeve 112 provided with an integral lever arm 113 that swivelly supports at its outer or free end a shoe 114 corresponding to the shoe 111 carried by lever arms 110. The shoe 114 of one of the lever arms 113 cooperates with the lugs 83 of the links of one of the chains, while the shoe 114 of the other lever arm 113 cooperates with similar lugs of the links of the other chain. It will be noted that the outer surface of each lug 83 of the links of the chains is formed on a curvature concentric to the axis of rotation of the sprockets 77 and 78, wherefore as the chains travel around the sprockets the lugs 83 will successively pass between the sides of the shoes 111 and 114 so that upon the completion of each indexing movement a lug 83 will be embraced by each shoe 111 and 114, as indicated in Figs. 3 and 4.

Assuming that the sprockets and chains have been indexed to a predetermined position corresponding to a spindle speed as heretofore explained and the main control lever is moved from the dash line position of Fig. 1 to the full line position thereof to impart an upward movement of the rod 97, it will be seen that the collar 101 will also be raised upwardly and through its operative connection with the links 106 will break or move the same from straight line relationship shown in Fig. 10 into the relationship shown in Fig. 9 and such movement of the links will cause the sleeves 108 and the rods 109 and lever arms 110 and 113 to rock with an equalized movement in a direction inwardly toward each other. Inasmuch as the shoes 111 and 114 carried by the levers 110 and 113 are straddling the lugs 83 of the links of both chains and since the tongues 82 of the links of both chains are in the peripheral grooves 80 of the sprockets, this movement of the lever arms 113 and 110 toward each other results in an equalized movement of the chains and sprockets toward each other axially of the shafts 76 and 79 to bring the projections on the adjacent sides of the links of the chains into engagement with the pins 63, 66 and 75 to shift the same and, in turn, effect the desired shifting movement of the gear cones in the change speed gearing.

A brief résumé will now be given of the manner in which the selecting or preselecting mechanism functions and for purposes of illustration the operation of the mechanism will be described in connection with the preselection of the spindle speeds for the different operative steps of a work cycle.

Assuming that the spindle speeds for the different operative steps of a work cycle have been determined and that a work piece is mounted on the work spindle 22 and the main control lever is in neutral position, i. e., the dash line position of Fig. 1 and the full line position of Fig. 2 with the parallel chains in their most separated position or in a position wherein they may be indexed, the operator now turns the hand wheel 93 to index the chains to the proper position for obtaining the spindle speed for the first operative step of the cycle, the amount of turning movement to be imparted to the hand wheel for this purpose being determined from the indicating device 96 which will indicate the desired spindle speed when the chains have been correctly indexed. The operator then moves the control lever 51 downwardly from the dash line position of Fig. 1 to the full line position thereof to cause the chains to move toward each other with an equalized movement to effect a shifting of the gear cones to obtain the spindle speed preselected for the first operative step in the cycle. Upon the completion of the downward movement of the main control lever the operator then moves the same horizontally to engage the main driving clutch for imparting rotation to the work spindle in either the forward or reverse direction, as the case may be, at the preselected speed. When this has been done the operator then pushes the control lever upwardly and allows the same to remain in that position. It will be understood that the upwerd movement of the control lever effects a separation of the chains to indexing position. The machine is now operating in the first step of the operative cycle and the operator at any time during this step may turn the hand wheel 93 to index the chains to preselect the spindle speed for the next operative step in the cycle. Upon the completion of the first operative step the operator moves the control lever horizontally to neutral position and then downwardly to cause the chains to move toward each other to shift the shiftable gear cones to obtain the preselected speed, after which he moves the control lever horizontally to again engage the main driving clutch to cause the spindle to rotate at the preselected speed for the second operative step in the cycle and then he pushes the control lever upwardly to cause the chains to move outwardly to indexing position so that he can preselect the spindle speed for the third operative step in the work cycle. This mode of operation is followed by the operator throughout the entire number of operative steps in the cycle.

In case the operator desires to select the spindle speeds for the different operative steps, as distinguished from preselecting the same, it will be understood that he will disengage the main driving clutch to stop rotation of the work spindle before the chains are indexed to obtain the spindle speed for the next step. In other words, upon the completion of one operative step in the work cycle, the operator moves the lever horizontally to disengage the clutch, then indexes the chains to select the following spindle speeds, and then moves the lever downwardly to obtain the selected speed, and then horizontally to engage the main driving clutch, and upwardly to bring the chains back to indexing position, or he can wait until the operative step is completed before moving the lever to bring the chains back to indexing position.

From the foregoing description it will have been seen that the mechanism for selecting or preselecting the different rates of movement for the movable part of a machine tool is such that it is effectively employed in operative association with the change speed drive for said part, wherein the shiftable elements of the drive and the members that effect the shifting of said elements are arranged relatively far apart with respect to each other. Inasmuch as the selecting or preselecting chains are continuous and elongated the projections on the links of the chains will be located closely adjacent to the shiftable pins that actuate the shiftable elements of the transmission, and hence it is unnecessary to employ a large or complicated number of intermediate motion transmitting elements between the projections of the links of the chain and the shiftable elements of the transmission.

Although a preferred form of the invention has been illustrated and described herein, it will be understood that the invention is susceptible of various modifications and adaptations within the scope of the appended claims.

Having thus described my invention I claim:

1. In a machine tool having a movable part, a change speed transmission for moving said part at different rates and including shiftable elements, and mechanism for selecting or preselecting the different rates of movement for said part and including an indexible member, a flexible element operatively mounted on said indexible member and indexed thereby to select or preselect the different rates and provided with actuating portions, and means for imparting additional movement to said flexible element to cause said actuating portions to actuate the shiftable elements of said change speed transmission to obtain the selected or preselected rate.

2. In a machine tool, a movable part, a change speed transmission for moving said part at different rates and including shiftable elements, and mechanism for selecting or preselecting the different rates of movement for said part and including a pair of indexible members, flexible elements operatively associated with each of said members and indexed thereby to select or preselect the different rates and provided with actuating portions, and means for imparting additional movement to said flexible elements to obtain the selected or preselected rates.

3. In a machine tool having a movable part, a change speed transmission for moving said part at different rates and including shiftable elements, and mechanism for selecting or preselecting the different rates of movement for said part and including an indexible member, a flexible element operatively mounted on said indexible member and indexed thereby to select or preselect the different rates and provided with actuating portions, and means for moving said flexible element laterally to cause said portions to actuate the shiftable elements of said change speed transmission to obtain the selected or preselected rate.

4. In a machine tool having a movable part, a change speed transmission for moving said part at different rates and including shiftable elements, and mechanism for selecting or preselecting the different rates of movement for said part and including a pair of indexible members, flexible elements operatively associated with said indexible members and indexed thereby to select or preselect the different rates and provided with actuating portions, and means for moving said flexible elements laterally to cause said portions to actuate the shiftable elements of said change speed transmission to obtain the selected or preselected rate.

5. In a machine tool having a movable part, a change speed transmission for moving said part at different rates and including shiftable elements, and mechanism for selecting or preselecting the different rates of movement for said part and including a pair of spaced members one of which is indexible, an endless flexible element surrounding said members and operatively associated with the indexible member to be indexed thereby to select or preselect the different rates of movement for said part and provided with actuating portions, and means for imparting an additional movement to said flexible element to cause said portions to actuate the said shiftable elements to obtain the selected or preselected rate.

6. In a machine tool, a movable part, a change speed transmission for moving said part at different rates and including shiftable elements, and mechanism for selecting or preselecting the rates of movement for said part and including spaced pairs of members with one member of each pair indexible, flexible elements surrounding each pair of members and having actuating portions and operatively associated with the indexible member thereof to be indexed to select or preselect the different rates of movement, and means for imparting to each flexible element an additional movement to cause said portions to actuate said shiftable elements to obtain the selected or preselected rate.

7. In a machine tool having a movable part, a change speed transmission for moving said part at different rates and including shiftable elements, and mechanism for selecting or preselecting the different rates of movement for said part and including a pair of spaced members one of which is indexible, a flexible element surrounding said members and operatively associated with the indexible member to be indexed thereby to select or preselect the different rates of movement for said part and provided with actuating portions, and means for moving said flexible element laterally to cause said portions to actuate said shiftable elements to obtain the selected or preselected rate.

8. In a machine tool, a movable part, a change speed transmission for moving said part at different rates and including shiftable elements, and mechanism for selecting or preselecting the rates of movement of said part and including spaced pairs of members with one member of each pair indexible, flexible elements surrounding each pair of members and having actuating portions and operatively associated with the indexible member to be indexed to select or preselect the different rates of movement, and means for moving said flexible elements laterally to cause said portions to actuate said shiftable elements to obtain the selected or preselected rate.

9. In a machine tool, a movable part, a change speed transmission for moving said part at different rates and including shiftable elements and means for shifting said elements having separated operating devices, a mechanism for selecting or preselecting the different rates of movement for said part and including an elongated flexible element provided with actuating portions, means for indexing said element to bring various of said actuating portions into operative position with respect to said operating devices, and means for moving said element to bring said certain actuating portions into contact with said operating devices to shift the latter to shift said shiftable elements to obtain the selected or preselected rate.

10. In a machine tool, a movable part, a change speed transmission for moving said part at different rates and including shiftable elements and means for shifting said elements having separated operating devices, a mechanism for selecting or preselecting the different rates of movement for said part and including parallel flexible elements arranged on opposite sides of said operating devices and provided with actuating portions, means for indexing said flexible elements to bring certain of said actuating portions into operative position with respect to said devices to select or preselect the different rates, and means for moving said flexible elements toward each other with an equalized movement to bring said certain actuating portions into engagement with said operating devices to shift said shiftable elements to obtain the selected or preselected rate.

11. In a machine tool, a movable part, a change speed transmission for moving said part at different rates of movement and including shiftable elements and operating devices for said elements spaced with respect to each other, and a mechanism for selecting or preselecting the different rates of movement for said part and including spaced pairs of members arranged on opposite sides of said operating devices with a corresponding member of each pair indexible, flexible elements surrounding the members of each pair of members and arranged parallel to each other and on opposite sides of said operating devices and provided with actuating portions, means for indexing said indexible members of each pair of members to index said flexible elements to bring certain of said actuating portions into operative position with respect to said operating devices, and means for moving the corresponding members of said pairs of members and said flexible elements toward each other with an equalized movement to bring said certain actuating portions into engagement with said devices to shift said shiftable elements to obtain the selected or preselected rate.

12. In a machine tool, a movable part, a change speed transmission for moving said part at different rates and including shiftable elements and operating devices for said elements, and a mechanism for selecting or preselecting the different rates of movement for said part and including a pair of spaced rotatable members, a flexible element surrounding said members and provided with actuating portions, means forming an operative connection between said rotatable members and said flexible element, means for rotating one of said rotatable members to index said flexible element to bring certain of said actuating portions into operative position with respect to said devices to select or preselect the different rates, and means for moving said rotatable members axially to move said flexible element laterally to bring said certain actuating portions into engagement with said devices to effect a shifting of the shiftable elements to obtain the selected or preselected rate of movement.

13. In a machine tool, a movable part, a change speed transmission for moving said part at different rates and including shiftable elements, and mechanism for selecting or preselecting the different rates of movement for said part and including a chain formed of a plurality of links each of which is provided with actuating portions, means for indexing said chain to bring certain links thereof into predetermined positions related to different rates of movement, and means for imparting an additional movement to said chain to effect a predetermined shifting of the shiftable elements to obtain the selected or preselected rate of movement.

14. In a machine tool, a movable part, a change speed transmission for moving said part at different rates and including shiftable elements and operating devices for shifting said elements, and a mechanism for selecting or preselecting the different rates of movement for said part and including parallel chains arranged on opposite sides of said operating devices and formed of a plurality of links each of which is provided with actuating portions, means for simultaneously indexing said chains to position certain of the links with their actuating portions in operative position with respect to said operating devices to select or preselect the different rates, and means for moving said chains toward each other with an equalized movement to bring said certain actuating portions into engagement with said operating devices to effect a shifting of said shiftable elements to obtain the selected or preselected rate of movement.

15. In a machine tool, a movable part, a change speed transmission for moving said part at different rates and including shiftable elements and operating devices for said elements, and a mechanism for selecting or preselecting the different rates of movement for said part and including a pair of rotatable members arranged on spaced parallel axes, a chain surrounding said members and formed of a plurality of links each of which is provided with actuating portions, said rotatable members and said links having cooperating means preventing movement of said chain relative to said members in a direction axially of said members, means for rotating one of said rotatable members to index said chain to bring certain of said actuating portions into operative position with respect to said operating devices, and means for moving said rotatable members axially to move said chain and bring said certain actuating portions thereof into operative engagement with said devices to shift said shiftable elements to obtain the selected or preselected rate.

16. In a machine tool, a movable part, a change speed transmission for moving said part at different rates and including shiftable elements and operating devices for shifting said elements, and a mechanism for selecting or preselecting the different rates of movement for said part and including a flexible element provided on one side thereof with outwardly projecting means and on another side with actuating portions, means for indexing said flexible element to position certain of said actuating portions in operative position with respect to said operating devices to select or preselect the different rates, and means having an operative connection with said outwardly projecting means for moving said flexible element to bring said certain actuating portions into engagement with said operating devices to effect a shifting of said shiftable elements to obtain the selected or preselected rate of movement.

17. In a machine tool, a movable part, a change speed transmission for moving said part at different rates and including shiftable elements and operating devices for shifting said elements, and a mechanism for selecting or preselecting the different rates of movement for said part and including parallel flexible elements arranged on opposite sides of said operating devices, said flexible elements being provided on one side thereof with outwardly projecting means and on another side thereof with actuating portions, means for simultaneously indexing said flexible elements to position certain of said actuating portions in operative position with respect to said operating devices to select or preselect the different rates, and means having an operative connection with said outwardly projecting means for moving said flexible elements toward each other with an equalized movement to bring said certain actuating portions into engagement with said operating devices to effect a shifting of said shiftable elements to obtain the selected or preselected rate of movement.

18. In a machine tool, a movable part, a change speed transmission for moving said part at different rates and including shiftable elements and operating devices for said elements, and a mechanism for selecting or preselecting the different rates of movement for said part and including a pair of spaced rotatable members, a flexible element surrounding said members and provided on its inner side with means cooperating with said rotatable members to prevent movement of said flexible element axially of said members, said flexible element being provided on its outer side with outwardly projecting means and on another side with actuating portions, means for rotating one of said rotatable members to index said flexible element to bring certain of said actuating portions into operative position with respect to said devices to select or preselect the different rates, and means having an operative connection with said outwardly projecting means for moving said element laterally and said rotatable members axially to bring said certain actuating portions into engagement with said devices to effect a shifting of the shiftable elements to obtain the selected or preselected rate of movement.

19. In a machine tool, a movable part, a change speed transmission for moving said part at different rates and including shiftable elements and operating devices for said elements, and a mechanism for selecting or preselecting the different rates of movement for said part and including a chain formed of a plurality of links provided on one side with outwardly projecting portions and on another side with actuating portions, means for indexing said chain to bring certain of said actuating portions into operative position with respect to said operating devices, and means successively having an operative connection with said outwardly projecting portions to move said chain laterally to bring said certain actuating portions into engagement with said operating devices to effect a predetermined shifting of the shiftable elements to obtain the selected or preselected rate of movement.

20. In a machine tool, a movable part, a change speed transmission for moving said part at different rates and including shiftable elements and operating devices for shifting said elements, and a mechanism for selecting or preselecting the different rates of movement for said part and including a pair of rotatable members provided with peripheral grooves, a chain surrounding said members and formed of links each of which is provided with a tongue arranged to engage in said grooves and with actuating portions, means for indexing one of said rotatable members to index said chain, and means to move said chain laterally and said rotatable members axially.

21. In a machine tool, a movable part, a change speed transmission for moving said part at different rates and including shiftable elements, and mechanism for selecting or preselecting the different rates of movement for said part and including a pair of rotatable polygonal members provided with peripheral grooves, a chain surrounding said members and formed of links substantially of the width of the sides of said members and provided on their member contacting sides with tongues cooperating with said grooves, said links being provided on their opposite sides with outwardly projecting lugs, means for rotating one of said members to index said chain, and means successively having an operative connection with said lugs for moving said chain laterally and said rotatable members axially.

22. In a machine tool, a movable part, a change speed transmission for moving said part at different rates and including shiftable elements, and mechanism for selecting or preselecting the different rates of movement for said part and including a chain formed of a plurality of links corresponding in number to the different rates of movement of said part and each of which is provided with actuating portions, means for indexing said chain to bring certain links thereof into predetermined positions related to different rates of movement of said part, and means for imparting an additional movement to said chain to effect a predetermined shifting of the shiftable elements to obtain the selected or preselected rate of movement.

23. In a machine tool, a movable part, a change speed transmission for moving said part at different rates and including shiftable elements and operating devices for said elements, and mechanism for selecting or preselecting the different rates of movement for said part and including a chain formed of a plurality of links corresponding in number to the different rates of movement of said part and each of which is provided with actuating portions, means for indexing said chain to bring certain but different links thereof into operative relationship to the different operating devices, and means for imparting an additional movement to said chain to actuate said operating devices to effect a predetermined shifting of the shiftable elements to obtain the selected or preselected rate of movement.

24. In a machine tool, a movable part, a change speed transmission for moving said part at different rates and including shiftable elements and operating devices for shifting said elements, and a mechanism for selecting or preselecting the different rates of movement for said part and including two parallel chains arranged on opposite sides of said operating devices with the links of said chains arranged in cooperating pairs and corresponding in number to the different rates of movement of said movable part and each being provided with actuating portions, means for simultaneously indexing said chains to position certain but different of said cooperating pairs of links with their actuating portions in operative position with respect to said operating devices to select or preselect the different rates, and means for moving said chains toward each other with an equalized movement to bring the actuating portions of said certain but different cooperating pairs of links into engagement with said operating devices to effect a shifting of said shiftable elements to obtain the selected or preselected rate of movement.

MAX E. LANGE.